(12) United States Patent
Kim et al.

(10) Patent No.: US 12,368,216 B2
(45) Date of Patent: Jul. 22, 2025

(54) HIGH VOLTAGE COMPONENT FOR AN ELECTRIC VEHICLE

(71) Applicant: Ticona LLC, Florence, KY (US)

(72) Inventors: Young Shin Kim, Cincinnati, OH (US);
Kent Miller, Lexington, KY (US);
Monika Taut, Hofheim am Taunus (DE)

(73) Assignee: Ticona LLC, Florence, KY (US)

( * ) Notice: Subject to any disclaimer, the term of this patent is extended or adjusted under 35 U.S.C. 154(b) by 584 days.

(21) Appl. No.: 17/708,206

(22) Filed: Mar. 30, 2022

(65) Prior Publication Data

US 2022/0336931 A1   Oct. 20, 2022

Related U.S. Application Data

(60) Provisional application No. 63/176,448, filed on Apr. 19, 2021.

(51) Int. Cl.
| | |
|---|---|
| *H01M 50/522* | (2021.01) |
| *H01B 3/02* | (2006.01) |
| *H01M 50/503* | (2021.01) |
| *H01M 50/505* | (2021.01) |

(52) U.S. Cl.
CPC ............ *H01M 50/522* (2021.01); *H01B 3/02* (2013.01); *H01M 50/503* (2021.01); *H01M 50/505* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 7,294,431 B2 | 11/2007 | Puttaiah et al. | |
| 8,920,955 B1 | 12/2014 | Chuang et al. | |
| 8,921,457 B2 | 12/2014 | Maruyama et al. | |
| 9,206,300 B2 | 12/2015 | Zhao et al. | |
| 9,340,656 B2 | 5/2016 | Mulholland | |
| 9,355,753 B2 | 5/2016 | Kim | |
| 9,450,275 B2 | 9/2016 | Obasih et al. | |
| 9,692,031 B2 | 6/2017 | Subramanian et al. | |
| 10,023,716 B2 | 7/2018 | Mulholland | |
| 10,103,084 B2 | 10/2018 | Powers | |
| 10,236,489 B2 | 3/2019 | Chen et al. | |
| 10,862,078 B2 * | 12/2020 | Kim .................. | H01M 10/655 |

(Continued)

OTHER PUBLICATIONS

Product Information—Vectra® LCP from Celanese, Sep. 19, 2013, 12 pages.

(Continued)

*Primary Examiner* — Kevin M Bernatz
(74) *Attorney, Agent, or Firm* — Dority & Manning, P.A.

(57) ABSTRACT

A high voltage electrical component for an electric vehicle is provided. The component comprises a polymer composition that includes a polymer matrix containing a liquid crystalline polymer. The composition exhibits a comparative tracking index of about 125 volts or more as determined in accordance with IEC 60112:2003 at a thickness of 3 millimeters. Further, the composition defines an orange surface that is characterized by a L* value of from about 55 to about 75, an a* value of from about 18 to about 38, and a b* value of from about 22 to about 42, wherein L*, a*, and b* are calculated using CIELAB units according to ASTM D2244-16.

28 Claims, 7 Drawing Sheets

(56) References Cited

U.S. PATENT DOCUMENTS

| | | |
|---|---|---|
| 11,028,304 B2 | 6/2021 | Kim |
| 11,136,445 B2 | 10/2021 | Kim |
| 11,377,514 B2 | 7/2022 | Gopalan et al. |
| 11,824,340 B2 | 11/2023 | Dopadlo et al. |
| 2013/0123420 A1* | 5/2013 | Kim .................. C08L 77/00 524/592 |
| 2013/0203897 A1 | 8/2013 | Kornmann et al. |
| 2018/0026250 A1 | 1/2018 | Mattmuller et al. |
| 2020/0144579 A1 | 5/2020 | Narayanan et al. |
| 2021/0054190 A1* | 2/2021 | Kim .................. C08K 7/14 |
| 2021/0253847 A1 | 8/2021 | Bienmueller et al. |
| 2021/0261771 A1* | 8/2021 | Kim .................. C08L 67/00 |
| 2021/0265075 A1* | 8/2021 | Kim .................. H05K 3/1258 |
| 2022/0153962 A1 | 5/2022 | Endtner et al. |
| 2022/0186005 A1 | 6/2022 | Johnson |
| 2022/0243055 A1 | 8/2022 | Kim |
| 2022/0282087 A1* | 9/2022 | Endtner .............. C08K 3/30 |
| 2022/0302640 A1* | 9/2022 | Pasetti .............. H01R 13/53 |
| 2022/0336930 A1* | 10/2022 | Kim .................. H01M 50/522 |
| 2024/0030558 A1* | 1/2024 | Kim .................. H01M 50/505 |

OTHER PUBLICATIONS

Product Information—Bus Bars from Methode Power Solutions Group (A Methode Electronics, Inc. Company), 3 pages.
International Search Report and Written Opinion for PCT/US2022/024410 dated Jul. 6, 2022, 9 pages.
Supplementary European Search Report for EP 22 79 2220 dated Feb. 11, 2025, 9 pages.

* cited by examiner

FIG. 14 ature tracking index ("CTI"), such as about 125 volts or more,
HIGH VOLTAGE COMPONENT FOR AN ELECTRIC VEHICLE

RELATED APPLICATION

The present application is based upon and claims priority to U.S. Provisional Patent Application Ser. No. 63/176,448, having a filing date of Apr. 19, 2021, which is incorporated herein by reference.

BACKGROUND OF THE INVENTION

Electric vehicles, such as battery-electric vehicles, plug-in hybrid-electric vehicles, mild hybrid-electric vehicles, or full hybrid-electric vehicles generally have an electric powertrain that contains an electric propulsion source (e.g., battery) and a transmission. Plastic insulation materials are often employed in the electric vehicle for various components, such as in high voltage connectors, power converter housings, battery assembly housings, busbars, twisted cables, individual sense lead wires, wire crimps, grommet moldings, etc. To help signal to a user or installer that the components are intended for high voltage, it is often desired that the plastic insulation is orange in color (e.g., 480 VAC in US standards). One problem, however, is that is often difficult to achieve an orange color for many plastic materials without adversely impacting other properties, such as their insulative properties at high voltages. As such, a need currently exists for a high voltage electrical component, such as employed in electrical vehicles, that can exhibit an orange color and still retain other desirable properties.

SUMMARY OF THE INVENTION

In accordance with one embodiment of the present invention, a high voltage electrical component for an electric vehicle is disclosed. The component comprises a polymer composition that includes a polymer matrix containing a liquid crystalline polymer. The composition exhibits a comparative tracking index of about 125 volts or more as determined in accordance with IEC 60112:2003 at a thickness of 3 millimeters. Further, the composition defines an orange surface that is characterized by a L* value of from about 55 to about 75, an a* value of from about 18 to about 38, and a b* value of from about 22 to about 42, wherein L*, a*, and b* are calculated using CIELAB units according to ASTM D2244-16.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures including.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a high voltage electrical component that can be used in an electric vehicle, such as a battery-powered electric vehicle, fuel cell-powered electric vehicle, plug-in hybrid-electric vehicle (PHEV), mild hybrid-electric vehicle (MHEV), full hybrid-electric vehicle (FHEV), etc. For instance, the electrical component may be a busbar, bracket, insert, connector, housing, etc. The electrical component may be configured to operate at an operating voltage of about 200 volts or more, for instance from about 200 volts to about 1000 volts, or from about 400 volts to about 800 volts in some embodiments. The electrical component includes a polymer composition that can serve to insulate a conductive portion of the component. For example, the polymer composition may insulate a conductive body of a busbar from surrounding components.

Through selective control over the nature and relative concentration of the components in the polymer composition, the present inventors have discovered that the resulting polymer composition can achieve a unique combination of insulative properties and an orange color, even at relatively small thickness values, such as about 8 millimeters or less, in some embodiments about 4 millimeters or less, in some embodiments about from about 0.2 to about 3.2 millimeters or less, in some embodiments from about 0.4 to about 1.6 millimeters, and in some embodiments, from about 0.4 to about 0.8 millimeters. The insulative properties of the polymer composition may be characterized by a high comparative tracking index ("CTI"), such as about 125 volts or more, in some embodiments about 150 volts or more, in some embodiments about 170 volts or more, and in some embodiments, from about 180 to about 300 volts, such as determined in accordance with IEC 60112:2003 at a part thickness such as noted above (e.g., 3 millimeters). While exhibiting a high CTI value, the composition may still exhibit an orange color. The orange color may be characterized using CIELAB units according to ASTM D2244-16 under illuminant D65, 10° observer with specular mode included. This method defines three color coordinates L*, a*, and b*, which correspond to three characteristics of a perceived color based on the opponent theory of color perception and are defined as follows:

L*=Luminosity value ranging from 0 to 100, where 0=black and 100=white;

a*=Red/green axis, ranging from −150 to 100; positive values are reddish and negative values are greenish; and b*=Yellow/blue axis, ranging from −100 to 100; positive values are yellowish and negative values are bluish.

More particularly, the polymer composition (or a shaped part formed therefrom) may define a surface having an orange color that exhibits an L* value of from about 55 to about 75, in some embodiments from about 58 to about 72, in some embodiments from about 59 to about 70, and in some embodiments, from about 60 to about 66; an a* value of from about 18 to about 38, in some embodiments from about 19 to about 36, in some embodiments from about 21 to about 32, and in some embodiments, from about 24 to about 30; and/or a b* value of from about 22 to about 42, in some embodiments from about 24 to about 40, in some embodiments from about 27 to about 38, and in some embodiments, from about 28 to about 36.

The polymer composition may also be flame retardant and heat resistant. The flammability can be characterized in accordance the procedure of Underwriters Laboratory Bulletin 94 entitled "Tests for Flammability of Plastic Materials, UL94." Several ratings can be applied based on the time to extinguish ((total flame time of a set of 5 specimens) and ability to resist dripping as described in more detail below. According to this procedure, for example, the composition may exhibit a V0 rating at a part thickness such as noted above (e.g., from about 0.3 to about 3.2 millimeters, from about 0.4 to about 2 millimeters, from about 0.5 millimeters to about 1 millimeter, e.g., 0.8 millimeters), which means that it has a total flame time of about 50 seconds or less. To achieve a V0 rating, the composition may also exhibit a total number of drips of burning particles that ignite cotton of 0.

In addition to the excellent insulative and thermal properties, the polymer composition can exhibit desirable mechanical properties for use in high voltage applications. For example, the composition may exhibit a Charpy impact strength (e.g., notched) of about 10 kJ/m² or more, in some embodiments from about 20 to about 40 kJ/m², and in some embodiments, from about 25 to about 30 kJ/m², measured at 23° C. according to ISO Test No. 179-1:2010. The composition may also exhibit a tensile strength of from about 50 to about 500 MPa, in some embodiments from about 80 to about 400 MPa, and in some embodiments, from about 100 to about 350 MPa; tensile break strain of about 0.5% or more, in some embodiments from about 0.8% to about 15%, and in some embodiments, from about 1% to about 10%; and/or tensile modulus of from about 5,000 MPa to about 30,000 MPa, in some embodiments from about 7,000 MPa to about 25,000 MPa, and in some embodiments, from about 10,000 MPa to about 20,000 MPa. The tensile properties may be determined in accordance with ISO Test No. 527: 2019 at 23° C. The composition may also exhibit a flexural strength of from about 80 to about 500 MPa, in some embodiments from about 100 to about 400 MPa, and in some embodiments, from about 150 to about 350 MPa; flexural break strain of about 0.5% or more, in some embodiments from about 0.8% to about 15%, and in some embodiments, from about 1% to about 10%; and/or flexural modulus of about 7,000 MPa or more, in some embodiments from about 9,000 MPa or more, in some embodiments, from about 10,000 MPa to about 30,000 MPa, and in some embodiments, from about 12,000 MPa to about 25,000 MPa. The flexural properties may be determined in accordance with ISO Test No. 178:2019 at 23° C. The composition may also exhibit a deflection temperature under load (DTUL) of about 200° C. or more, in some embodiments about 240° C. or more, and in some embodiments, from about 250° C. to about 300° C., as measured according to ISO Test No. 75-2:2013 at a specified load of 1.8 MPa.

Various aspects of the present invention will now be described in more detail.

I. Polymer Composition

A. Polymer Matrix

The polymer composition contains a polymer matrix that includes one or more liquid crystalline polymers. The polymer matrix generally from about 30 wt. % to about 80 wt. %, in some embodiments from about 40 wt. % to about 75 wt. %, and in some embodiments, from about 50 wt. % to about 70 wt. % of the polymer composition. The liquid crystalline polymers are generally considered "high performance" polymers in that they have a relatively high glass transition temperature and/or high melting temperature depending on the particular nature of the polymer. Such high performance polymers can thus provide a substantial degree of heat resistance to the resulting polymer composition. For example, the liquid crystalline polymers may have a melting temperature of about 220° C. or more, in some embodiments from about 260° C. to about 420° C., and in some embodiments, from about 300° C. to about 400° C. The melting temperature may be determined as is well known in the art using differential scanning calorimetry ("DSC"), such as determined by ISO Test No. 11357-3:2018.

Liquid crystalline polymers have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). Such polymers may be formed from one or more types of repeating units as is known in the art. A liquid crystalline polymer may, for example, contain one or more aromatic ester repeating units generally represented by the following Formula (1):

(I)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 40 mol. % or more, in some embodiments about 45 mol. % or more, and in some embodiments, from about 50 mol. % to 100 mol. % of the polymer. In one embodiment, for example, repeating units derived from HBA may constitute from about 30 mol. % to about 90 mol. % of the polymer, in some embodiments from about 40 mol. % to about 85 mol. % of the polymer, and in some embodiments, from about 50 mol. % to about 80 mol. % of the polymer. Repeating units derived from HNA may likewise constitute from about 1 mol. % to about 30 mol. % of the polymer, in some embodiments from about 2 mol. % to about 25 mol. % of the polymer, and in some embodiments, from about 3 mol. % to about 15 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 50 mol. %, in some embodiments from about 2 mol. % to about 40 mol. %, and in some embodiments, from about 5 mol. % to about 30 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a relatively low content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically about 15 mol. % or less, in some embodiments about 10 mol. % or less, and in some embodiments, from about 1 mol. % to about 8 mol. % of the polymer.

B. Orange Colorant

An orange colorant is generally distributed within the polymer matrix to provide the desired color. The colorant may, for example, include one or more pigments that provide the desired orange color, such as orange pigments, yellow pigments, red pigments, etc., as well as combinations thereof. Particularly suitable pigments can include, without limitation, Paliotol® Yellow K 0961 HD, Paliotol® Yellow K 1700, Paliotol® Yellow K 1841, Paliotol® Yellow K 1800, Paliotol® Yellow K 2270, Diarylide Yellow (opaque) 1270, Rightfit® Yellow K 1220, Rightfit® Yellow 8G 1222, Rightfit® Yellow R 1226, Rightfit® Yellow K 1994, Rightfit® Yellow 1292, Rightfit® Yellow 1293, Rightfit® Yellow 1296, Rightfit® Yellow 3R 1298, Synergy® Yellow HG 6202, Synergy® Yellow 6204, Synergy® Yellow 6205, Synergy® Yellow 6207, Synergy® Yellow 6210, Synergy® Yellow 6213, Synergy® Yellow 6222, Synergy® Yellow 6223, Synergy® Yellow 6225, Synergy® Yellow 6226, Synergy® Yellow 6233, Synergy® Yellow 6234, Synergy® Yellow 6235, Synergy® Yellow 6261, Synergy® Yellow 6268, Synergy® Yellow 6290, Synergy® Yellow 6298, Paliotol® Orange K 2920, Dianisidine Orange 2915, Synergy® Orange 6103, Synergy® Orange 6106, Synergy® Orange 6112, Synergy® Orange 6113, Synergy® Orange Y 6114, Synergy® Orange RL 6118, Synergy® Orange Y 6135, Synergy® Orange HL 6136, Synergy® Orange 6139, Synergy® Orange G 6164, Synergy® Orange 6170, PV FAST® orange 6RL, fast Light® yellow 5GL, direct fast yellow 2R, directly Everbright® fast yellow 5R, direct fast yellow GC, direct fast yellow G, direct fast yellow RS, direct fast yellow L-5R, direct fast yellow ARL, directly Everbright® fast orange TGL, direct Fast Orange GGL, Vulcan®

Fast Yellow, C. I. 12055 red, C. I. 12075 Permanent Orange, C. I. 12175 Lithol Fast Orange 3GL, C. I. 12305 Permanent Orange GTR, C. I. 11725 Hansa Yellow 3R, C. I. 21165 Vulcan® Fast Orange GG, Paliogen® Red K 3580, Paliogen® Red K 3911 H, Citation® Red Light Barium 1058, Naphthol Red Light 3169, Naphthol Red 3170, Naphthol Red 3172, Naphthol Red 3175, MadderLake conc. 1092, Pigment Scarlet 1060, Rightfit® Red K 3790, Rightfit® Red K 4350, Rightfit® Red 1117, Rightfit® Pink 1118, Synergy® Scarlet 6012, Synergy® Red 6016, Synergy® Red 6019, Synergy® Red 6054, Synergy® Red 6065, Synergy® Red 6069, Synergy® Red 6075, Transbarium 2B Red 1057, Synergy® Magenta 6062, Synergy® Red 6027, Supermaroon ST 1090, Paliogen® Red K 4180.

In certain embodiments, a combination of pigments may be employed to achieve the desired color. For example, the colorant may contain one or more yellow pigments in combination with one or more orange pigments. In such cases, yellow pigment(s) may constitute from about 60 wt. % to about 95 wt. %, in some embodiments from about 70 wt. % to about 95 wt. %, and in some embodiments, from about 80 wt. % to about 92 wt. % of the total weight of pigments employed in the colorant, as well as from about 0.1 wt. % to about 8 wt. %, in some embodiments from about 0.2 wt. % to about 6 wt. %, and in some embodiments, from about 0.5 wt. % to about 4 wt. % of the entire polymer composition. Orange pigment(s) may likewise constitute from about 5 wt. % to about 40 wt. %, in some embodiments from about 5 wt. % to about 30 wt. %, and in some embodiments, from about 8 wt. % to about 20 wt. % of the total weight of pigments employed in the colorant, as well as from about 0.01 wt. % to about 1 wt. %, in some embodiments from about 0.05 wt. % to about 0.8 wt. %, and in some embodiments, from about 0.1 wt. % to about 0.6 wt. % of the entire polymer composition. The total amount of pigment(s) employed in the polymer composition typically ranges from about 0.2 wt. % to about 10 wt. %, in some embodiments from about 0.3 wt. % to about 8 wt. %, and in some embodiments, from about 0.6 wt. % to about 5 wt. % of the entire polymer composition.

If desired, the colorant may also include a carrier resin to enhance the ability of the pigment(s) to be handled and incorporated into the polymer matrix. While any known carrier resin may be employed for this purpose, it is particularly desired that the carrier resin includes a liquid crystalline polymer, such as described above. In fact, in certain embodiments, the liquid crystalline polymer(s) of the carrier resin have the same melting temperature and/or monomeric constituents as the liquid crystalline polymer(s) employed in the polymer matrix. The carrier resin is typically pre-blended with the pigment(s) to form a colorant masterbatch, which can later be combined with the polymer matrix. When employed, the carrier resin typically constitutes from about 60 wt. % to about 99 wt. %, in some embodiments from about 70 wt. % to about 95 wt. %, and in some embodiments, from about 80 wt. % to about 90 wt. % of the colorant. Pigment(s) may likewise constitute from about 1 wt. % to about 40 wt. %, in some embodiments from about 5 wt. % to about 30 wt. %, and in some embodiments, from about 10 wt. % to about 20 wt. % of the colorant.

Although by no means required, it may also be desirable to employ a compatibilizer within the colorant to help improve the ability of the pigment(s) to be processed with the carrier resin, polymer matrix, and/or other components of the composition. When employed, such compatibilizers(s) may constitute from about 0.01 wt. % to about 8 wt. %, in some embodiments, from about 0.1 wt. % to about 4 wt. %, and in some embodiments, from about 0.2 wt. % to about 3 wt. % of the colorant, as well as from about 0.001 wt. % to about 2 wt. %, in some embodiments, from about 0.01 wt. % to about 0.8 wt. %, and in some embodiments, from about 0.05 wt. % to about 0.5 wt. % of the entire polymer composition. One suitable compatibilizer that may be employed is a mineral oil. Mineral oils are chemically inert oils composed mainly of linear, branched, and cyclic alkanes (paraffins) of various molecular weights, related to white petrolatum. Suitable mineral oils may include, for instance, Blandol® white mineral oil, Carnation® white mineral oil, Klearol® white mineral oil, Semtol® white mineral oil, and Witco 40 Oil® white mineral oil.

C. Inorganic Fibers

To help improve mechanical properties, the polymer composition may optionally contain inorganic fibers distributed within the polymer matrix. Such fibers may, for instance, constitute from about 10 to about 80 parts, in some embodiments from about 20 to about 70 parts, and in some embodiments, from about 30 to about 60 parts per 100 parts by weight of the polymer matrix. Inorganic fibers may likewise constitute from about 5 wt. % to about 50 wt. %, in some embodiments from about 10 wt. % to about 45 wt. %, and in some embodiments, from about 15 wt. % to about 35 wt. % of the polymer composition. The inorganic fibers generally have a high degree of tensile strength relative to their mass. For example, the ultimate tensile strength of the fibers is typically from about 1,000 to about 15,000 MPa, in some embodiments from about 2,000 MPa to about 10,000 MPa, and in some embodiments, from about 3,000 MPa to about 6,000 MPa. The high strength fibers may be formed from materials that are also electrically insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof. The inorganic fibers may have a relatively small median diameter, such as about 50 micrometers or less, in some embodiments from about 0.1 to about 40 micrometers, and in some embodiments, from about 2 to about 20 micrometers, such as determined using laser diffraction techniques in accordance with ISO 13320:2009 (e.g., with a Horiba LA-960 particle size distribution analyzer). It is believed that the small diameter of such fibers can allow their length to be more readily reduced during melt blending, which can further improve surface appearance and mechanical properties. After formation of the polymer composition, for example, the average length of the inorganic fibers may be relatively small, such as from about 10 to about 800 micrometers, in some embodiments from about 100 to about 700 micrometers, and in some embodiments, from about 200 to about 600 micrometers. The inorganic fibers may also have a relatively high aspect ratio (average length divided by nominal diameter), such as from about 1 to about 100, in some embodiments from about 10 to about 60, and in some embodiments, from about 30 to about 50.

D. Mineral Filler

If desired, the polymer composition may also contain one or more mineral fillers. When employed, such mineral fillers typically constitute from about 10 to about 80 parts, in some embodiments from about 20 to about 70 parts, and in some embodiments, from about 30 to about 60 parts per 100 parts by weight of the polymer matrix. The mineral filler may, for instance, constitute from about 1 wt. % to about 50 wt. %, in some embodiments from about 5 wt. % to about 30 wt. %, and in some embodiments, from about 10 wt. % to about 20 wt. % of the polymer composition. By selectively tailoring the type and relative amount of the mineral filler, the present inventor has not only discovered that the mechanical properties can be improved, but also that the thermal conductivity can be increased without significantly impacting other properties of the polymer composition. This allows the composition to be capable of creating a thermal pathway for heat transfer away from the resulting electronic device so that "hot spots" can be quickly eliminated and the overall temperature can be lowered during use. The composition may, for example, exhibit an in-plane thermal conductivity of about 0.2 W/m-K or more, in some embodiments about 0.5 W/m-K or more, in some embodiments about 0.6 W/m-K or more, in some embodiments about 0.8 W/m-K or more, and in some embodiments, from about 1 to about 3.5 W/m-K, as determined in accordance with ASTM E 1461-13. The composition may also exhibit a through-plane thermal conductivity of about 0.3 W/m-K or more, in some embodiments about 0.5 W/m-K or more, in some embodiments about 0.40 W/m-K or more, and in some embodiments, from about 0.7 to about 2 W/m-K, as determined in accordance with ASTM E 1461-13. Such a thermal conductivity can be achieved without use of conventional materials having a high degree of intrinsic thermal conductivity. For example, the polymer composition may be generally free of fillers having an intrinsic thermal conductivity of 50 W/m-K or more, in some embodiments 100 W/m-K or more, and in some embodiments, 150 W/m-K or more. Examples of such high intrinsic thermally conductive materials may include, for instance, boron nitride, aluminum nitride, magnesium silicon nitride, graphite (e.g., expanded graphite), silicon carbide, carbon nanotubes, zinc oxide, magnesium oxide, beryllium oxide, zirconium oxide, yttrium oxide, aluminum powder, and copper powder. While it is normally desired to minimize the presence of such high intrinsic thermally conductive materials, they may nevertheless be present in a relatively small percentage in certain embodiments, such as in an amount of about 10 wt. % or less, in some embodiments about 5 wt. % or less, and in some embodiments, from about 0.01 wt. % to about 2 wt. % of the polymer composition.

The nature of the mineral filler employed in the polymer composition may vary, such as mineral particles, mineral fibers (or "whiskers"), etc., as well as blends thereof. Suitable mineral fibers may, for instance, include those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4 W or NYGLOS® 8). The mineral fibers may have a median diameter of from about 1 to about 35 micrometers, in some embodiments from about 2 to about 20 micrometers, in some embodiments from about 3 to about 15 micrometers, and in some embodiments, from about 7 to about 12 micrometers. The mineral fibers may also have a narrow size distribution. That is, at least about 60% by volume of the fibers, in some embodiments at least about 70% by volume of the fibers, and in some embodiments, at least about 80% by volume of the fibers may have a size within the ranges noted above. Without intending to be limited by theory, it is believed that mineral fibers having the size characteristics noted above can more readily move through molding equipment, which enhances the distribution within the polymer matrix and minimizes the creation of surface defects. In addition to possessing the size characteristics noted above, the mineral fibers may also have a relatively high aspect ratio (average length divided by median diameter) to help further improve the mechanical properties and surface quality of the resulting polymer composition. For example, the mineral fibers may have an aspect ratio of from about 2 to about 100, in some embodiments from about 2 to about 50, in some embodiments from about 3 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

Other suitable mineral fillers are mineral particles. The average diameter of the particles may, for example, range from about 5 micrometers to about 200 micrometers, in some embodiments from about 8 micrometers to about 150 micrometers, and in some embodiments, from about 10 micrometers to about 100 micrometers. The shape of the particles may vary as desired, such as granular, flake-shaped, etc. In some embodiments, the particles may have a median particle diameter (D50) of from about 1 to about 25 micrometers, in some embodiments from about 2 to about 15 micrometers, and in some embodiments, from about 4 to about 10 micrometers, as determined by sedimentation analysis (e.g., Sedigraph 5120). If desired, the particles may also have a high specific surface area, such as from about 1 square meters per gram ($m^2/g$) to about 50 $m^2/g$, in some embodiments from about 1.5 $m^2/g$ to about 25 $m^2/g$, and in some embodiments, from about 2 $m^2/g$ to about 15 $m^2/g$. Surface area may be determined by the physical gas adsorption (BET) method (nitrogen as the adsorption gas) in accordance with DIN 66131:1993. The moisture content may also be relatively low, such as about 5% or less, in some embodiments about 3% or less, and in some embodiments, from about 0.1 to about 1% as determined in accordance with ISO 787-2:1981 at a temperature of 105° C.

Regardless of their characteristics, the particles are typically formed from a natural and/or synthetic silicate mineral, such as talc, mica, halloysite, kaolinite, illite, montmorillonite, vermiculite, palygorskite, pyrophyllite, calcium silicate, aluminum silicate, wollastonite, etc. Talc and mica are particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc.

E. Optional Components

A wide variety of additional additives can also be included in the polymer composition, such as impact modifiers, lubricants, stabilizers, surfactants, waxes, flame retardants, anti-drip additives, nucleating agents (e.g., boron nitride) and other materials added to enhance properties and processability. Lubricants, for example, may be employed in the polymer composition in an amount from about 0.05 wt. % to about 1.5 wt. %, and in some embodiments, from about 0.1 wt. % to about 0.5 wt. % (by weight) of the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide.

II. Formation

The components of the polymer composition (e.g., liquid crystalline polymer, colorant, etc.) may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 10 to about 250 Pa-s, in some embodiments from about 15 to about 200 Pa-s, in some embodiments from about 20 to about 150 Pa-s, and in some embodiments, from about 30 to about 100 Pa-s, determined at a shear rate of 1,000 seconds$^{-1}$. Melt viscosity may be determined in accordance with ISO Test No. 11443: 2021 at a temperature that is 15° C. higher than the melting temperature of the composition (e.g., about 350° C. for a melting temperature of about 335° C.).

III. High Voltage Electrical Component

A variety of different high voltage electrical components may be formed using the polymer composition described herein. For example, the electrical component may be employed in a battery assembly that contains a first battery having a first terminal (e.g., positive terminal) and a second battery having a second terminal (e.g., positive or negative terminal). The first and second terminals of the batteries may be connected together with a busbar that includes a conductive body and an insulative portion. The insulative portion may be formed from the polymer composition of the present invention.

Figure 1:
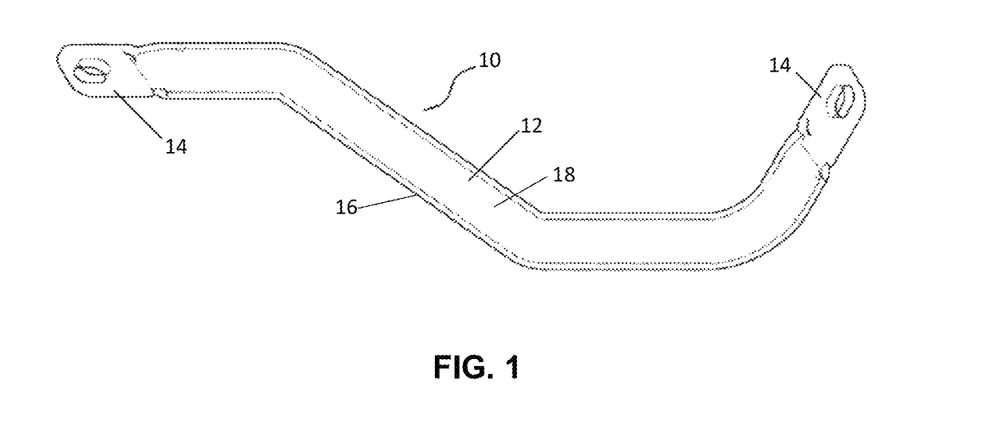
FIG. 1 illustrates one embodiment of a busbar that may be formed according to the present invention.

Referring to FIG. 1, one embodiment of a busbar 10 is shown that includes a conductive body 12. The body 12 includes a conductive material 18, such as copper, aluminum, aluminum alloy, etc., and can generally be in the form of a solid bar, hollow tube, and so forth. The busbar 10 includes a connector portion 14 at either end that is configured to mate with respective terminations of two or more batteries. An insulative portion 16 (e.g., coating or molded material) that includes the polymer composition as described herein may cover a portion of the conductive material of the body 12. To form the busbar 10, the insulative portion 16 can be applied to the surface of the conductive material 18. For instance, a bar or tube of the conductive material 18 can be inserted into a pre-formed tube of the insulating coating 16, e.g., an extruded tube sized and cut to the correct proportions, following which the busbar 10 can be shaped to any suitable form. In another embodiment, the insulating coating can be applied to the surface of the conductive material 18 in the melt, and can solidify on the surface of the conductive material in the applied areas.

Figure 2:
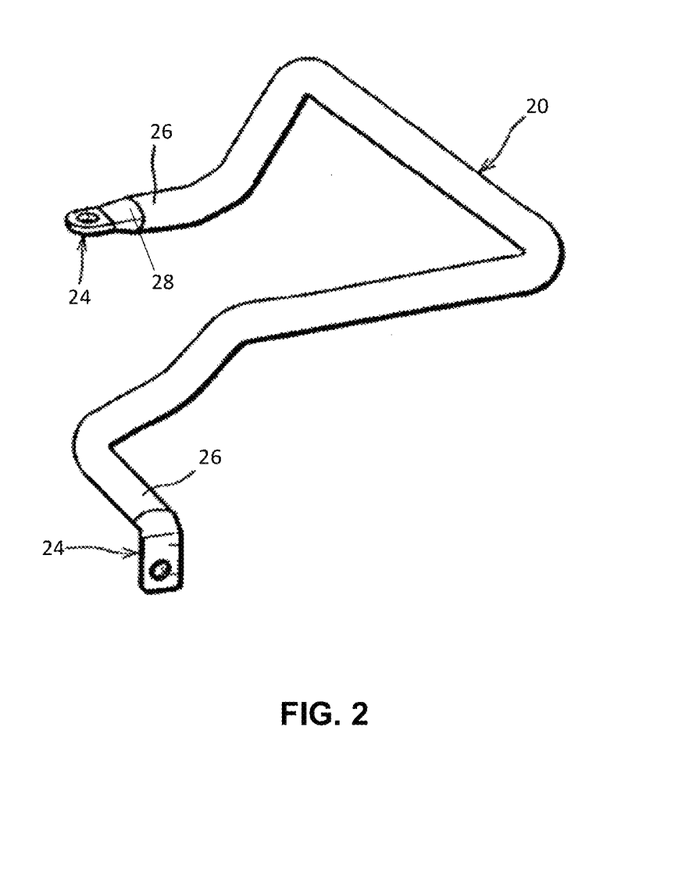
FIG. 2 illustrates another embodiment of a busbar that may be formed according to the present invention.

FIG. 2 presents another example of a busbar 20 that can include an insulative portion in the form of a coating disposed over the conductive body. In this embodiment, the busbar 20 includes a tube-shaped conductive body that is covered along its length with an insulative coating 26, which may include the polymer composition as described. The busbar 20 may also include connector portions 24 at either end configured for connection to a receiving battery terminal.

Figure 3:
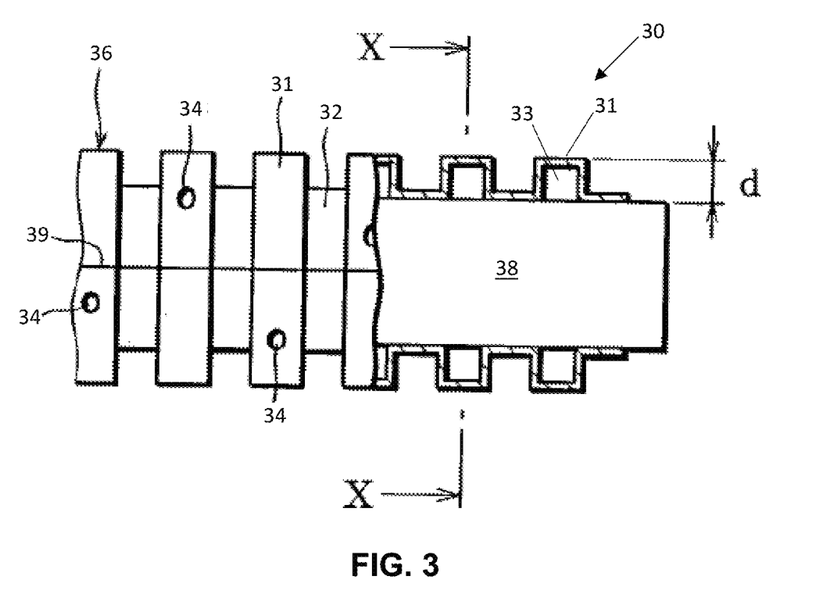
FIG. 3 illustrates a portion of a busbar that may be formed according to the present invention that includes a cutaway view of an insulative coating.
Figure 4:
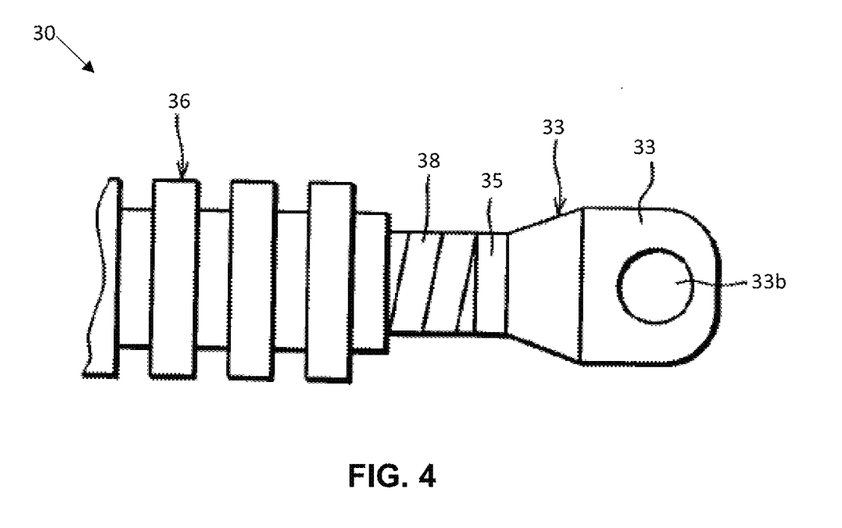
FIG. 4 illustrates an end portion of one embodiment of a busbar that may be formed according to the present invention.

FIGS. 3-4 illustrate portions of a busbar 30 that may include a high surface area insulative portion. More particularly, an insulative portion 36 is disposed over a conductive body 38 that is in the form of a corrugated tube on which peaks 31 and valleys 32 are alternately formed. The insulative portion 36 may contain the polymer composition of the present invention. If desired, the valleys 32 can have an inner diameter slightly larger than the outer diameter of the conductive body 38, while the peaks 31 can have a space 33 between the conductive body 38 and the wall of the peaks 31. In one embodiment, the peaks 31 can include vent holes 34 at certain positions. The busbar 30 also includes a terminal 33 at the end of the conductive body 38 that includes a plate 33a and an aperture 33b for mating with a battery. In one embodiment, the insulative portion 36 can include an incision 39 extending in the axial direction over the entire length thereof, so that it is openable circumferentially. Thus, a conductive body 38 can be inserted into the opened insulative portion 36. Optionally, to prevent slippage of the conductive body 38 within the insulative portion 36, a heat-resistant tape 35 can be wrapped around the end of the conductive body 38.

Apart from busbars, other high voltage electrical components may also employ the polymer composition of the present invention. For example, an electrical connector may be employed that includes a first connector portion that contains at least one electrical contact and an insulating member that surrounds at least a portion of the connector portion. The insulating member may contain the polymer composition of the present invention. The first connector portion may be configured to mate with an opposing second connector portion that contains a receptacle for receiving the electrical contact. In such embodiments, the second connector portion may contain at least one receptacle configured to receive the electrical contact of the first connector portion and an insulating member that surrounds at least a portion of the second connector portion. The insulating member of the second connector portion may also contain the polymer composition of the present invention. For instance, in certain embodiments, the thickness of the insulating member of the second connector portion may be within the ranges noted above and thus beneficially formed from the polymer composition.

Figure 5:
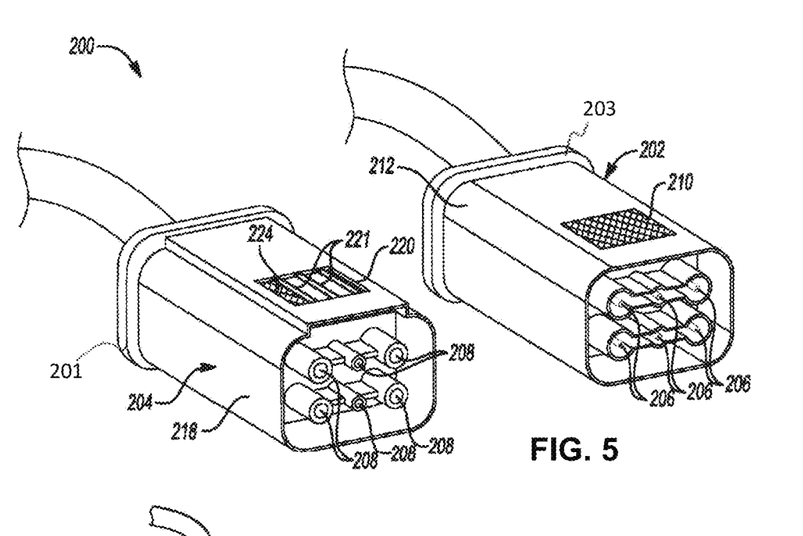
FIG. 5 is a perspective view of one embodiment of a connector that may be formed according to the present invention.
Figure 6:
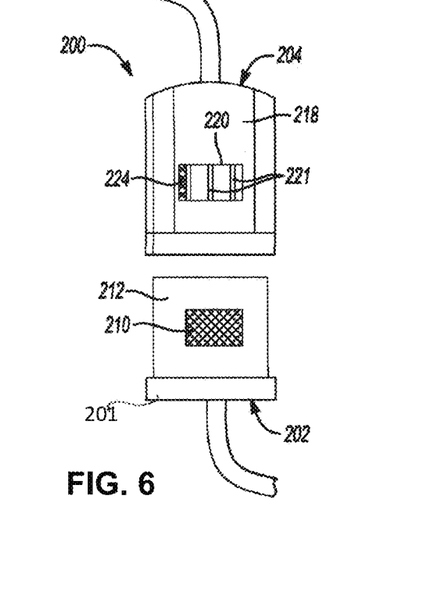
FIG. 6 is a plan view of the connector of FIG. 5 in which the first and second connector portions are disengaged.
Figure 7:
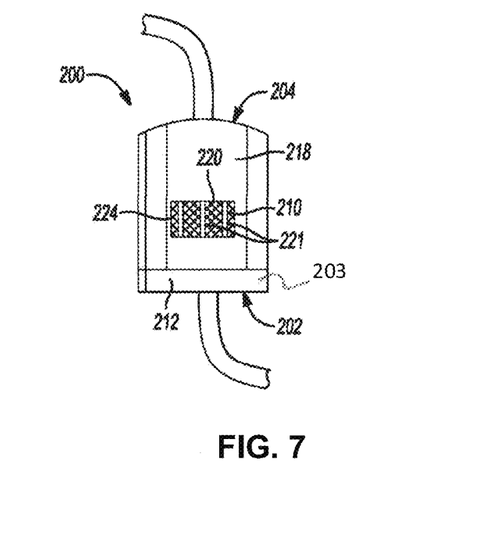
FIG. 7 is a plan view of the connector of FIG. 5 in which the first and second connector portions are engaged.

Referring to FIGS. 5-7, one particular embodiment of a connector 200 is shown for use in a relatively high voltage application, e.g., an electric vehicle powertrain. The connector 200 contains a first connector portion 202 and a second connector portion 204. The first connector portion 202 may include one or more electrical pins 206 and the second connector portion 204 may include one or more receptacles 208 for receiving the electrical pins 206. A first insulator member 212 may extend from a base 203 of the first connecting portion 202 to surround the pins 206, and similarly, a second insulator member 218 may extend from a base 201 of the second connecting portion 204 to surround the receptacles 208. In certain cases, the periphery of the first insulator member 212 may extend beyond an end of the electrical pins 203 and the periphery of the second insulator member 218 may extend beyond an end of the receptacles 208. The base 203 and/or the first insulator member 212 of the first connector portion 202, as well as the base 201 and/or the second insulator member 218 of the second connector portion 204, may be formed from the polymer composition of the present invention.

Although by no means required, the first connector portion 202 may also include an identification mark 210 secured to or defined by the first protective member 212. The second connecting portion 204 may also optionally define an alignment window 220 sized according to the identification mark 210 to more easily determine when the portions are fully mated. For instance, the identification mark 210 may not be readable unless blockers 221 cover a portion of the identification mark 210. Optionally, the second connecting portion 204 may include a supplemental mark 224 located adjacent to the alignment window 220.

Figure 8:
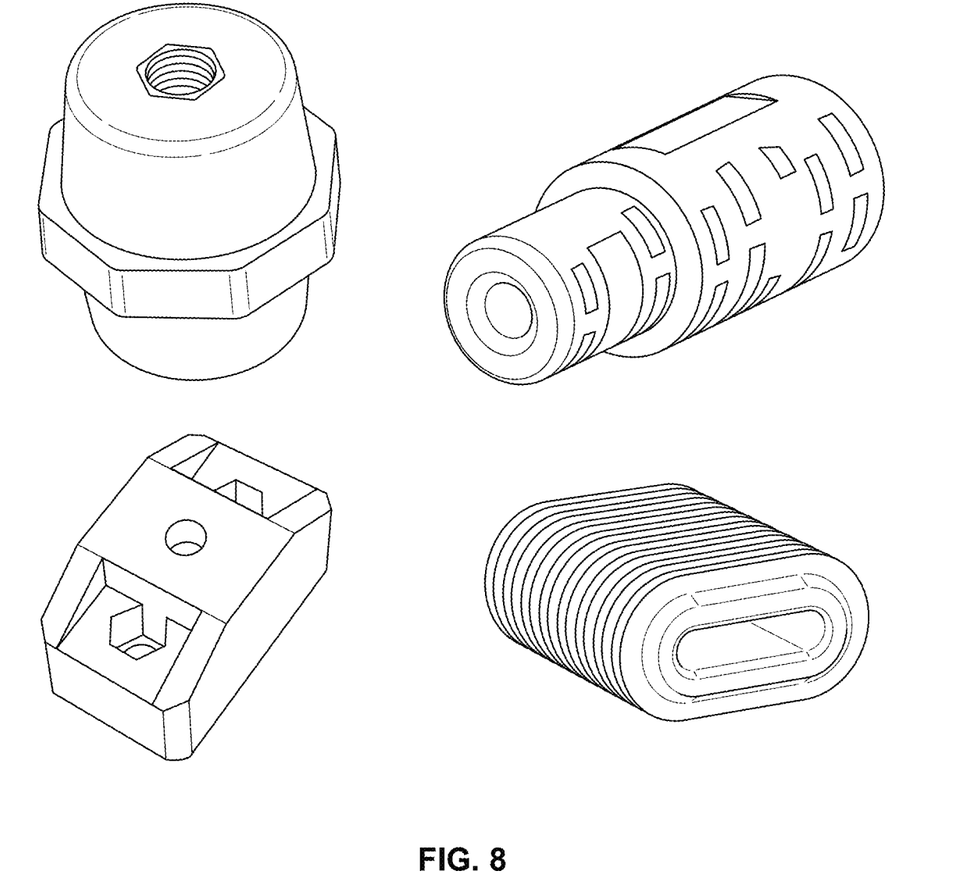
FIG. 8 illustrates examples of components that may be formed according to the present invention.

FIG. 8 illustrates yet other examples of high voltage components that may employed the polymer composition of the present invention, such as spacers, connectors, and supports that can be formed from the polymer composition.

The electrical component may be formed from the polymer composition using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer composition for a desired time period to allow for solidification. The molded product may then be solidified by bringing it to a temperature below that of the melting temperature. The resulting product may be de-molded. The cycle time for each molding process may be adjusted to suit the polymer composition, to achieve sufficient bonding, and to enhance overall process productivity.

Figure 9:
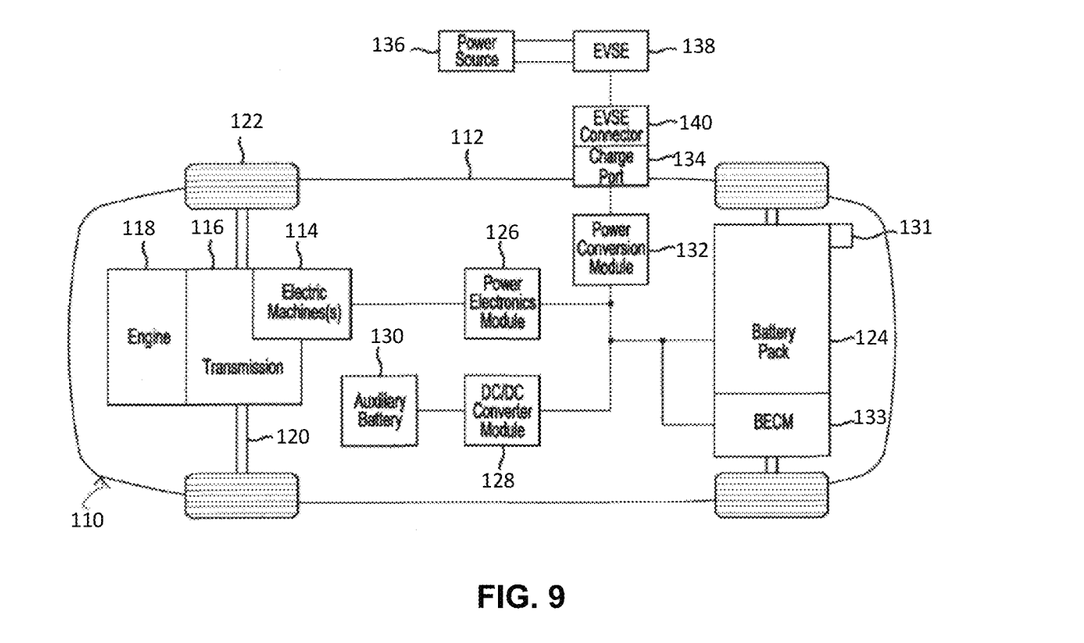
FIG. 9 illustrates one embodiment of an electric vehicle that may employ the high voltage electrical component of the present invention.

As previously mentioned, the high voltage electrical components are particularly beneficial for use in an electric vehicle. Referring to FIG. 9, for instance, one embodiment of an electric vehicle 112 that includes a powertrain 110 is shown. The powertrain 110 contains one or more electric machines 114 connected to a transmission 116, which in turn is mechanically connected to a drive shaft 120 and wheels 122. Although by no means required, the transmission 116 in this particular embodiment is also connected to an engine 118. The electric machines 114 may be capable of operating as a motor or a generator to provide propulsion and deceleration capability. The powertrain 110 also includes a propulsion source, such as a battery assembly 124, which stores and provides energy for use by the electric machines 114. The battery assembly 124 typically provides a high voltage current output (e.g., DC current at a voltage of from about 400 volts to about 800 volts) from one or more battery cell arrays that may include one or more battery cells.

The powertrain 110 may also contain at least one power electronics module 126 that is connected to the battery assembly 124 and that may contain a power converter (e.g., inverter, rectifier, voltage converter, etc., as well as combinations thereof). The power electronics module 126 is typically electrically connected to the electric machines 114 and provides the ability to bi-directionally transfer electrical energy between the battery assembly 124 and the electric machines 114. For example, the battery assembly 124 may provide a DC voltage while the electric machines 114 may require a three-phase AC voltage to function. The power electronics module 126 may convert the DC voltage to a three-phase AC voltage as required by the electric machines 114. In a regenerative mode, the power electronics module 126 may convert the three-phase AC voltage from the electric machines 114 acting as generators to the DC voltage required by the battery assembly 124. The description herein is equally applicable to a pure electric vehicle. The battery assembly 124 may also provide energy for other vehicle electrical systems. For example, the powertrain may employ a DC/DC converter module 128 that converts the high voltage DC output from the battery assembly 124 to a low voltage DC supply that is compatible with other vehicle loads, such as compressors and electric heaters. In a typical vehicle, the low-voltage systems are electrically connected to an auxiliary battery 130 (e.g., 12V battery). A battery energy control module (BECM) 133 may also be present that is in communication with the battery assembly 124 that acts as a controller for the battery assembly 124 and may include an electronic monitoring system that manages temperature and charge state of each of the battery cells. The battery assembly 124 may also have a temperature sensor 131, such as a thermistor or other temperature gauge. The temperature sensor 131 may be in communication with the BECM 133 to provide temperature data regarding the battery assembly 124. The temperature sensor 131 may also be located on or near the battery cells within the traction battery 124. It is also contemplated that more than one temperature sensor 131 may be used to monitor temperature of the battery cells.

In certain embodiments, the battery assembly 124 may be recharged by an external power source 136, such as an electrical outlet. The external power source 136 may be electrically connected to electric vehicle supply equipment (EVSE) that regulates and manages the transfer of electrical energy between the power source 36 and the vehicle 112. The EVSE 138 may have a charge connector 140 for plugging into a charge port 134 of the vehicle 112. The charge port 134 may be any type of port configured to transfer power from the EVSE 138 to the vehicle 112 and may be electrically connected to a charger or on-board power conversion module 132. The power conversion module 132 may condition the power supplied from the EVSE 138 to provide the proper voltage and current levels to the battery assembly 124. The power conversion module 132 may interface with the EVSE 138 to coordinate the delivery of power to the vehicle 112.

Figure 10:
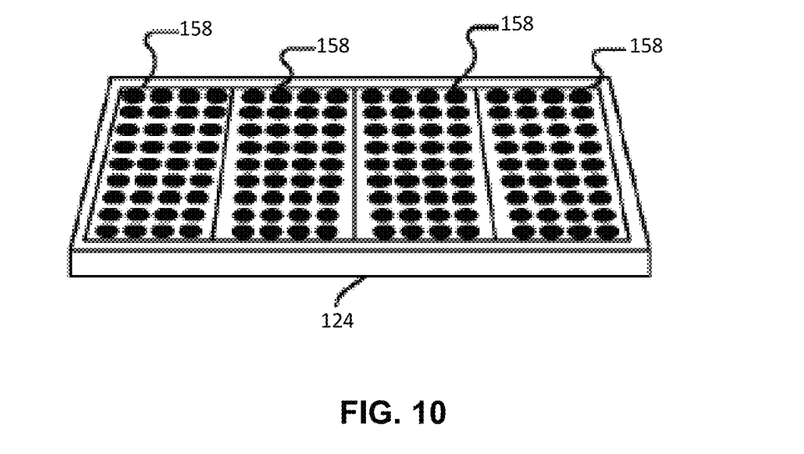
FIG. 10 illustrates a battery assembly that may employ the high voltage electrical component of the present invention.

The electrical component described herein can be included in various components of an electric vehicle as illustrated in FIG. 9. For instance, a busbar (not shown) may be used to electrically connect individual cells of the battery assembly 124. Referring to FIG. 10, for example, the battery assembly 124 can include a number of battery cells 158. The battery cells 158 may be stacked side-by-side to construct a grouping of battery cells, sometimes referred to as a battery array. In one embodiment, the battery cells 158 are prismatic, lithium-ion cells. However, battery cells having other geometries (cylindrical, pouch, etc.) and/or chemistries (nickel-metal hydride, lead-acid, etc.) could alternatively be utilized within the scope of this disclosure. Each battery cell 158 includes a positive terminal (designated by the symbol (+)) and a negative terminal (designed by the symbol (−)). The battery cells 158 are arranged such that each battery cell 158 terminal is disposed adjacent to a terminal of an adjacent battery cell 158 having an opposite polarity. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic, or some variation on the 18650 form-factor of 6.5 cm×1.8 cm and approximately 45 g.

Figure 11:
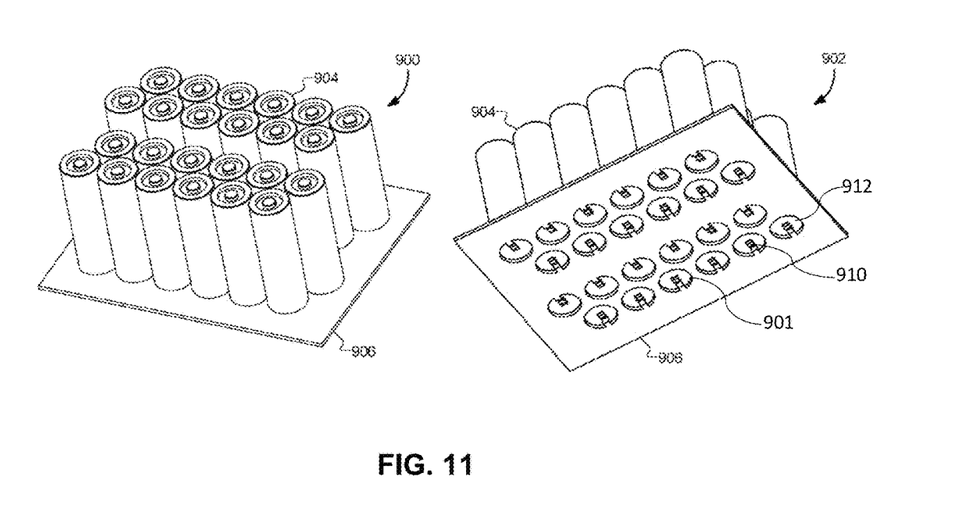
FIG. 11 illustrates two perspective views of a busbar aligned with a plurality of battery cells that may be employed in the present invention.

The manner in which the busbar connects to individual battery cells, such as shown in FIG. 10, may vary as is known in the art. Referring to FIG. 11, for example, a top isometric view 900 and a bottom isometric view 902 of a plate-style busbar 906 is shown aligned with a plurality of battery cells 904 arranged in a plurality of rows. The plurality of battery cells 904 is arranged in sets of adjacent rows as illustrated above in FIG. 10. The cutout sections 901 of the busbar 906 may include a recessed portion that allows the individual battery cells 904 to be placed within a portion of the cutout 901. In these embodiments, the busbar 906 may be used as a template for placing the individual battery cells so that they are uniform in each battery assembly manufactured. The busbar 906 may also hold the individual battery cells 904 in place during the manufacturing process and any thermal padding or injection-housings, which can be formed of a polymer composition as described herein, can be added without causing the individual battery cells to shift out of position. As illustrated by view 902, center tabs 910 of each cutout can make spring-like contact with the underside of each of the individual battery terminals without requiring any soldering or other type of mechanical connection. The busbar 906 can include insulator 912 as described herein on/around each contact area at each cutout section 901 that can retain an end of each battery cell 904. An insulator 912 can extend over the busbar 906 beyond the cutout sections 901 in some embodiments.

Figure 12:
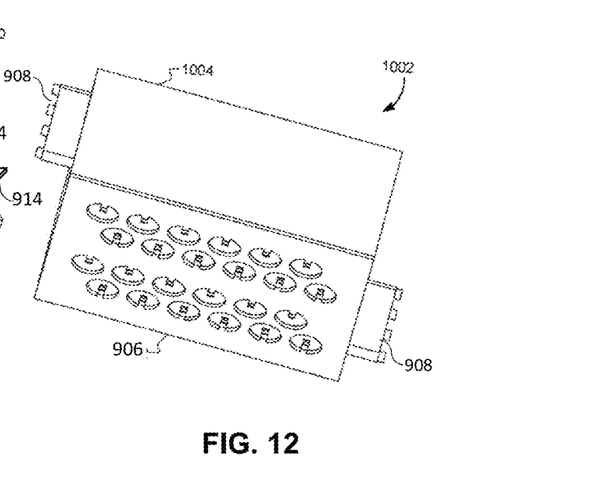
FIG. 12 illustrates the busbar of FIG. 11 mated with a battery assembly including a housing that may be employed in the present invention.

FIG. 12 illustrates a bottom isometric view 1002 of a busbar 906 mated with a battery assembly with a housing 1004. If desired, the housing 1004 can be formed of a polymer composition as described herein. The housing 1004 can be injected into an injection mold and formed so as to fit with and retain the battery cells 904. One embodiment, the housing 1004 be applied such that it is level with the top of the individual battery cells 904. In some embodiments, the housing 1004 does not cover the tops or bottoms of individual battery cells 904. Instead, these areas of the individual battery cells 904 are left exposed such that electrical connections can be made between individual battery cells 904 and a busbar 906 after the housing is applied. In other embodiments (not shown), the housing 1004 does not extend all the way to the top and/or bottom terminals of the battery assembly. In some embodiments, the exposed portion of the individual battery cells 904 may be between 1.0 mm and 15.0 mm. The amount of each individual battery cell 904 exposed may differ between the top and bottom portions of the individual battery cells 904. By leaving a portion of the individual battery cells 904 exposed, some types of electrical connections to the individual battery cells may be more easily applied.

In some embodiments, the busbar 906 can be placed within the housing 1004 and the the housing 1004 can cover the busbar connections with the battery cells 904. In one embodiment, a battery assembly can include a polymer composition as described herein injected into the housing 1004 and a solid battery assembly can be formed. In some embodiments, the busbar 916 may be secured to the bottom of the battery assembly by the housing 1004 or by other mechanical means, such as screws and/or adhesives.

Figure 13:
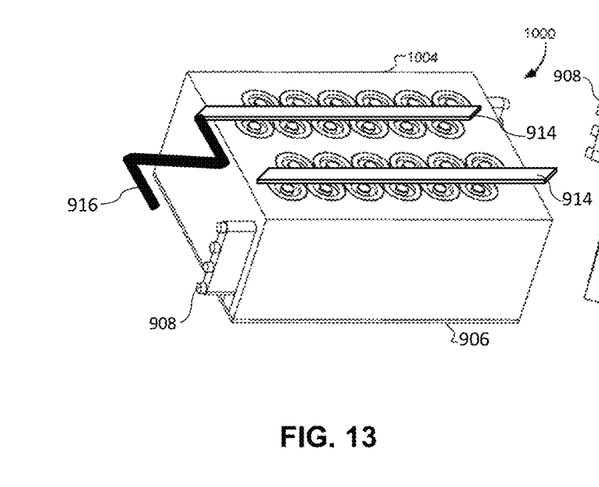
FIG. 13 illustrates another embodiment of a busbar aligned with a plurality of battery cells that may be employed in the present invention.

FIGS. 11-12 illustrate a plate style busbar 906 that is defined in a continuous plane that contacts every battery in the depicted section of the battery assembly. However, other embodiments need not be so limited. For instance, FIG. 12 illustrates another embodiment of busbars 914, 916 as described herein as may be utilized in a battery assembly. As illustrated, a battery assembly can include a plurality of busbars 914, 916 in the form of individual lengths of a conductive bar including an insulator covering one or more portions of the busbar. A busbar can be in any suitable geometric form such as a single, straight length 914, or a Z busbar 916 or a three dimensional geometry as discussed previously. For instance, a straight length busbar 914 can be connected to each battery cell 904 of a single row the battery assembly and a Z busbar 916 can provide a connection from busbar 914 to other electrical components of a system (e.g., an inverter). As illustrated in FIGS. 12-13, the battery assembly can also include one or more connectors 908, such as described above, for electrically connecting the battery assembly to other components of the electric vehicle, such as a power electronics module, such as a power electronics module 126, DC/DC converter module 128, and/or power conversion module 132 as shown in FIG. 9.

Figure 14:
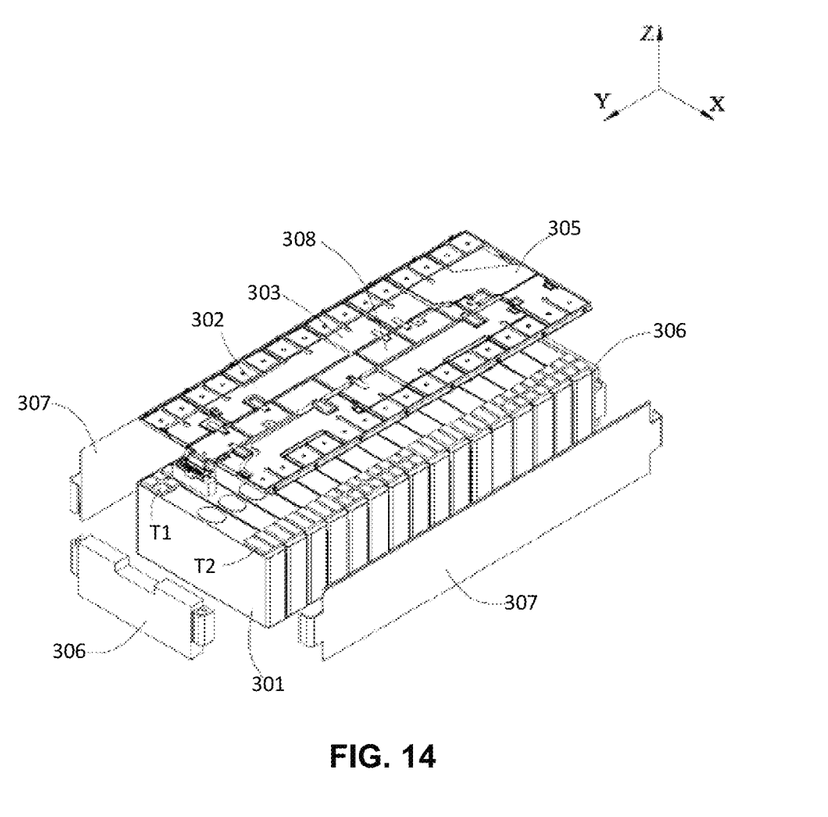
FIG. 14 illustrates another embodiment of a battery assembly that may be employed in the present invention.

FIG. 14 illustrates another embodiment of a battery assembly that may employ the polymer composition of the present invention. As illustrated, the battery assembly includes a plurality of battery cells 301 sequentially arranged in a longitudinal direction Y, end plates 306, side plates 307 and a wiring harness assembly 308. The battery assembly can also include two electrode terminals protruded outwardly from the top thereof, that is a positive electrode terminal T1 and a negative electrode terminal T2. In one embodiment, the end plates 306 and the side plates 307 can be connected together to form a rectangular frame, as shown. The battery cells 301 can be fixed with the frame by bonding. A busbar assembly is fixed with the wiring harness assembly 308 and includes a plurality of busbars 302, 303, and 305 in the form of flat plates. If desired, the busbars 302, 303, and/or 305, may include the polymer composition as described herein, for instance as a coating on a portion of the busbar or as a separator between a busbar and another component.

The present invention may be better understood with reference to the following examples.

Test Methods

Melt Viscosity: The melt viscosity (Pa-s) may be determined in accordance with ISO Test No. 11443:2021 at a shear rate of 1,000 s- and temperature 15° C. above the melting temperature using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2020. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-18). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break: Tensile properties may be tested according to ISO Test No. 527:2019 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress: Flexural properties may be tested according to ISO Test No. 178:2019 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Charpy Impact Strength: Charpy properties may be tested according to ISO Test No. ISO 179-1:2010) (technically equivalent to ASTM D256-10, Method B). This test may be run using a Type A notch (0.25 mm base radius) and/or Type 1 specimen size (length of 80 mm, width of 10 mm, and thickness of 4 mm). Specimens may be cut from the center of a multi-purpose bar using a single tooth milling machine. The testing temperature may be 23° C.

Comparative Tracking Index ("CTI"): The comparative tracking index (CTI) may be determined in accordance with International Standard IEC 60112-2003 to provide a quantitative indication of the ability of a composition to perform as an electrical insulating material under wet and/or contaminated conditions. In determining the CTI rating of a composition, two electrodes are placed on a molded test specimen. A voltage differential is then established between the electrodes while a 0.1% aqueous ammonium chloride solution is dropped onto a test specimen. The maximum voltage at which five (5) specimens withstand the test period for 50 drops without failure is determined. The test voltages range from 100 to 600 V in 25 V increments. The numerical value of the voltage that causes failure with the application of fifty (50) drops of the electrolyte is the "comparative tracking index." The value provides an indication of the relative track resistance of the material. According to UL746A, a nominal part thickness of 3 mm is considered representative of performance at other thicknesses.

UL94: A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 0.8 mm. The two sets are conditioned before and after aging. For unaged testing, each thickness is tested after conditioning for 48 hours at 23° C. and 50% relative humidity. For aged testing, five (5) samples of each thickness are tested after conditioning for 7 days at 70° C.

| Vertical Ratings | Requirements |
|---|---|
| V-0 | Specimens must not burn with flaming combustion for more than 10 seconds after either test flame application.<br>Total flaming combustion time must not exceed 50 seconds for each set of 5 specimens.<br>Specimens must not burn with flaming or glowing combustion up to the specimen holding clamp.<br>Specimens must not drip flaming particles that ignite the cotton.<br>No specimen can have glowing combustion remain for longer than 30 seconds after removal of the test flame. |
| V-1 | Specimens must not burn with flaming combustion for more than 30 seconds after either test flame application.<br>Total flaming combustion time must not exceed 250 seconds for each set of 5 specimens.<br>Specimens must not burn with flaming or glowing combustion up to the specimen holding clamp.<br>Specimens must not drip flaming particles that ignite the cotton.<br>No specimen can have glowing combustion remain for longer than 60 seconds after removal of the test flame. |
| V-2 | Specimens must not burn with flaming combustion for more than 30 seconds after either test flame application.<br>Total flaming combustion time must not exceed 250 seconds for each set of 5 specimens.<br>Specimens must not burn with flaming or glowing combustion up to the specimen holding clamp.<br>Specimens can drip flaming particles that ignite the cotton.<br>No specimen can have glowing combustion remain for longer than 60 seconds after removal of the test flame. |

Examples 1-2

An orange colorant is formed from a liquid crystalline polymer carrier resin (LCP 1), yellow pigment, orange pigment, and white mineral oil as noted below in Table 1. LCP 1 is formed from 60 mol. % HBA, 5 mol. % HNA, 12.5 mol. % BP 17.5 mol. % TA, and 5 mol. % APAP. The yellow pigment is Paliotol® Yellow K1800 (BASF) and the orange pigment is PV® Fast Orange 6RL (Clariant).

TABLE 1

| Material | Amount (wt. %) |
|---|---|
| LCP 1 | 84.00 |
| Yellow Pigment | 12.25 |
| Orange Pigment | 2.75 |
| White Mineral Oil | 1.00 |

The orange colorant is thereafter melt blended with additional liquid polymer resin (LCP 1), glass fibers, talc, and/or a lubricant as noted above in Table 2 to form two separate polymer composition samples. The components are fed into a twin-screw extruder, pelletized, and then injected molded into ISO tensile bars (80 mm×10 mm×4 mm) and tested.

TABLE 2

| Material | Example 1 (wt. %) | Example 2 (wt. %) |
|---|---|---|
| LCP 1 | 55.6 | 61.4 |
| Lubricant | 0.3 | 0.3 |
| Glass Fibers | 20.0 | 29.3 |
| Talc | 15.0 | — |
| Orange Colorant | 9.0 | 9.0 |

The samples are then tested for various electrical and mechanical properties as noted above. The results are set forth below in Table 3.

TABLE 3

|  | Ex. 1 | Ex. 2 |
|---|---|---|
| Tensile Modulus (MPa) | 12,700 | 15,500 |
| Tensile Strength (MPa) | 135 | 165 |
| Tensile Elongation (%) | 1.8 | 1.6 |
| Flexural Strength (MPa) | 200 | 235 |
| Flexural Modulus (MPa) | 13,500 | 15,900 |
| Charpy Notched at 23° C. (kJ/m$^2$) | 20 | 32 |
| Melt Viscosity at 1,000 s$^{-1}$ (Pa-s) | 35 | 32 |
| DTUL at 1.8 MPa (° C.) | 265 | 270 |
| Melting Temperature (° C.) | 335 | 333 |
| UL94 | V0 | V0 |
| CTI (V) | 200 | 175 |
| L* (CIELAB) | 65.0 | 63.8 |
| a* (CIELAB) | 27.3 | 29.2 |
| b* (CIELAB) | 30.8 | 34.2 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A high voltage electrical component for an electric vehicle, wherein the component comprises a polymer composition that includes a polymer matrix containing a liquid crystalline polymer, wherein the composition exhibits a comparative tracking index of about 125 volts or more as determined in accordance with IEC 60112:2003 at a thickness of 3 millimeters, and further wherein the composition defines an orange surface that is characterized by a L* value of from about 55 to about 75, an a* value of from about 18 to about 38, and a b* value of from about 22 to about 42, wherein L*, a*, and b* are calculated using CIELAB units according to ASTM D2244-16.

2. The high voltage electrical component of claim 1, wherein the polymer composition exhibits a UL94 V0 rating at a thickness of from about 0.3 millimeters to about 3.2 millimeters.

3. The high voltage electrical component of claim 1, wherein the polymer composition has a Charpy notched impact strength of about 10 KJ/m$^2$ or greater as measured at 23° C. according to ISO Test No. 179-1:2010.

4. The high voltage electrical component of claim 1, wherein the polymer composition exhibits a tensile strength of from about 50 to about 500 MPa, a tensile break strain of about 0.5% or more, and/or tensile modulus of from about 5,000 MPa to about 30,000 MPa as determined in accordance with ISO Test No. 527:2019 at 23° C.

5. The high voltage electrical component of claim 1, wherein the polymer composition exhibits a deflection temperature under load of about 200° C. or more as determined according to ISO 75-2:2013 at a specified load of 1.8 MPa.

6. The high voltage electrical component of claim 1, wherein the liquid crystalline polymer contains repeating units derived from an aromatic dicarboxylic acid, aromatic hydroxycarboxylic acid, or a combination thereof.

7. The high voltage electrical component of claim 6, wherein the polymer further comprises one or more repeating units derived from an aromatic diol, aromatic amide, aromatic amine, or a combination thereof.

8. The high voltage electrical component of claim 1, wherein the liquid crystalline polymer is wholly aromatic.

9. The high voltage electrical component of claim 1, wherein the total amount of repeating units in the liquid crystalline polymer derived from naphthenic hydroxycarboxylic acids and/or naphthenic dicarboxylic acids is about 15 mol. % or less.

10. The high voltage electrical component of claim 1, wherein the liquid crystalline polymer contains monomer units derived from 4-hydroxybenzoic acid, 6-hydroxy-2-naphthoic acid, terephthalic acid, 4,4'-biphenol, and acetaminophen.

11. The high voltage electrical component of claim 1, wherein the polymer matrix constitutes from about 30 wt. % to about 80 wt. % of the polymer composition.

12. The high voltage electrical component of claim 1, wherein an orange colorant is distributed within the polymer matrix.

13. The high voltage electrical component of claim 12, wherein the orange colorant includes an orange pigment, yellow pigment, red pigment, or a combination thereof.

14. The high voltage electrical component of claim 13, wherein yellow pigments constitute from about 60 wt. % to about 95 wt. % of the total weight of pigments employed in the colorant and orange pigments constitute from about 5 wt. % to about 40 wt. % of the total weight of pigments employed in the colorant.

15. The high voltage electrical component of claim 12, wherein the orange colorant further contains a carrier resin.

16. The high voltage electrical component of claim 15, wherein the carrier resin includes a liquid crystalline polymer.

17. The high voltage electrical component of claim 1, further comprising glass fibers distributed within the polymer matrix in an amount from about 10 parts to about 80 parts per 100 parts by weight of the polymer matrix.

18. The high voltage electrical component of claim 1, further comprising a mineral filler distributed within the polymer matrix in an amount from 10 parts to about 80 parts per 100 parts by weight of the polymer matrix.

19. The high voltage electrical component of claim 18, wherein the mineral filler includes talc particles.

20. The high voltage electrical component of claim 1, wherein the electrical component is an electrical connector.

21. The high voltage electrical component of claim 20, wherein the electrical connector comprises a first connector portion and a second connector portion, the first connector portion comprising one or more electrical pins and the second connector portion comprising a receptacle for receiving the one or more electrical pins.

22. The high voltage electrical component of claim 1, wherein the component is a busbar.

23. The high voltage electrical component of claim 22, wherein the busbar contains an insulative portion that covers at least a portion of a conductive body, wherein the insulative portion includes the polymer composition.

24. A battery assembly that includes a first battery cell and a second battery cell, wherein the high voltage electrical component of claim 23 connects the first battery cell to the second battery cell.

25. An electric vehicle comprising the high voltage electrical component of claim 1.

26. The electric vehicle of claim 25, the electric vehicle comprising a powertrain that includes at least one electric propulsion source and a transmission that is connected to the propulsion source via at least one power electronics module.

27. The electric vehicle of claim 26, wherein the propulsion source includes a battery assembly.

28. The high voltage electrical component of claim 1, wherein the composition comprises a mineral oil.

* * * * *